United States Patent [19]

Percec

[11] Patent Number: 4,665,137
[45] Date of Patent: May 12, 1987

[54] CROSSLINKABLE DIFUNCTIONALIZED POLY(PHENYLENE OXIDE) AND PROCESS FOR PREPARATION THEREOF

[75] Inventor: Virgil Percec, Pepper Pike, Ohio

[73] Assignee: The B. F. Goodrich Company, Akron, Ohio

[21] Appl. No.: 814,748

[22] Filed: Dec. 30, 1985

Related U.S. Application Data

[63] Continuation-in-part of Ser. No. 586,678, Mar. 6, 1984, Pat. No. 4,562,243.

[51] Int. Cl.$^4$ .................... C08G 65/48; C08G 75/23
[52] U.S. Cl. .................................. 525/534; 525/535; 526/286; 526/287; 526/288; 526/289; 526/332; 526/333; 526/334
[58] Field of Search .............................. 525/534, 535; 526/286–289, 332–334; 528/174, 212, 219, 373, 374, 375, 376

[56] References Cited

U.S. PATENT DOCUMENTS 4,562,243  12/1985  Percec ................................ 528/212

Primary Examiner—John Kight
Assistant Examiner—M. L. Moore
Attorney, Agent, or Firm—Alfred D. Lobo

[57] ABSTRACT

A process is disclosed for converting α,ω-bis(2,6-dimethylphenol)poly(2,6-dimethyl-1,4-phenylene oxide) ("PPO—2OH" for brevity), and the corresponding thiophenol-poly(phenylene sulfide) ("PPS—2SH"), by the oxidative copolymerization of 2,6-dimethylphenol (DMP) with 2,2'-di)4-hydroxy-3,5-dimethylphenyl propane ("TMBPA"), or, of 2,6-dimethylthiophenol (DMTP) with 2,2-di(4-thiol-3,5-dimethylthiophenyl propane ("TMBTPA") respectively. Specifically, a mixture of water-methanol or chlorobenzene-methanol is used as the medium in which the reaction of DMP with TMBPA is carried out. By using a particular range of ratios of DMP to TMBPA and different solvent mixtures, the molecular weight of the PPO—2OH is tailored to be in the range from about 1000 to about 5000. The PPO—2OH is then difunctionalized at its chain ends, so that in the first instance, there is provided a reactive double bond (for example, a vinylbenzyl group) at each end of the PPO—2OH; and, in the second instance, a triple bond (benzylethynyl group) at each end of the PPO—2OH. The thermal polymerization of the PPO—2VB has exceptionally desirable characteristics. The corresponding PPS—2VB is also crosslinkable and has high reactivity, but has quite different characteristics.

11 Claims, No Drawings

CROSSLINKABLE DIFUNCTIONALIZED POLY(PHENYLENE OXIDE) AND PROCESS FOR PREPARATION THEREOF

CROSS-REFERENCE TO RELATED APPLICATION

This application is a continuation-in-part of Ser. No. 586,678 filed on Mar. 6, 1984, now U.S. Pat. No. 4,562,243.

BACKGROUND OF THE INVENTION

This invention is related to difunctionalized oligomers of polyarylene polyethers, and more particularly to the preparation of (a) α,ω-bis(2,6-dimethylphenol)-poly(2,6-dimethyl-1,4-phenylene oxide) ("PPO—2OH" for brevity), and (b) α,ω-bis(2,6-dimethylthiophenol)-poly(2,6-dimethyl-1,4-phenylene sulfide) ("PPS—2SH") for brevity), by the oxidative copolymerization of 2,6-dimethylphenol (DMP) with 2,2'-di-(4-hydroxy-3,5-dimethylphenyl)propane ("TMBPA"), and of 2,6-dimethylthiophenol (DMTP) with 2,2'-di(4-thiol-3,5 dimethylthiophenyl)propane ("TMBTPA").

Because of poly(phenylene sulfide) (PPS) oligomers are presently less desirable than the poly(phenylene oxide) (PPO) oligomers, both from the viewpoint of physical and chemical properties as well as economics of manufacture, this specification is particularly devoted to the preparation of the latter PPO oligomers, it being understood that analogous procedures may be used to prepare the corresponding PPS oligomers.

Though various PPO—2OH and PPS—2SH oligomers may be difunctionalized as disclosed in my copending application Ser. No. 586,678 the disclosure of which is incorporated by reference thereto as if fully set forth herein, the best embodiment of the difunctionalized PPO-2OH is provided by oligomers of narrowly defined molecular weight which was not heretofore appreciated. Nor could such oligomers be tailored by any known process.

It will be appreciated that despite the essentiality of making perfectly bifunctional PPO—2OH having the desired mol wt, it has only recently been possible to convert the terminal OH groups to vinyl functional groups by phase transfer catalyzed (PTC) reactions, as described in my parent application, inter alia. Under two-phase, namely, aqueous NaOH-organic solvent PTC reaction conditions, the nucleophilicity of a phenol does not depend only on its chemical structure but also on its onium phenolate lipophilicity. A higher lipophilicity of the onium phenolate leads to better and faster extraction into the organic phase. This happens to be a fortuitous situation in which the nucleophilicity of a phenol present at the chain ends of a polymer is fortunately higher than that of its low mol wt homolog. This circumstance permits achieving, for the first time, essentially quantitative PTC polyetherifications of a polymer with phenol chain ends. Though the chain ends can provide either ethers or esters, the greater stability, under acidic or basic hydrolytic conditions, of the ethers make the ether bonds more desirable than the ester bonds.

It is known that 2,6-disubstituted phenols cannot be etherified to high conversions under normal Williamson reaction conditions, but can be quantitatively etherified in the presence of phase transfer catalsysts, as disclosed by McKillop, A., Fiaud, J. C., and Hug, R. P., *Tetrahedron* 30, 1379 (1974). Under PTC conditions I have quantitatively etherified the 2,6-dimethylphenol chain end of poly(2,6-dimethyl-1,4-phenylene oxide) ("PPO—OH") as disclosed in my copending U.S. patent application Ser. No. 586,679 filed Mar. 6, 1984. When the etherification was performed with an α,ω-di(electrophilic) oligomer it leads to an ABA triblock copolymer containing PPO as the A segments, as disclosed by Percec, V., and Nava, H., *Makromol. Chem. Rapid Commun.*, 5, 319 (1984).

Thus, I chose α,ω-bis(2,6-dimethylphenol)-poly(2,6-dimethyl-1,4-phenylene oxide) ("PPO-2OH") as the oligomer both for the synthesis of block copolymers as well as for the preparation of α,ω-bis(vinylbenzyl)-poly(2,6-dimethyl-1,4-phenylene oxide) ("PPO—2VB").

PPO may be difunctionalized by esterification as is disclosed in "Reactions of Poly(phenylene Oxide)s with Quinones. I. The Quinone-Coupling Reaction Between Low Molecular Weight Poly(2,6-Dimethyl-1,4-phenylene oxide) and 3,3',5,5'-tetramethyl-4,4'-Diphenoquinone", by Dwain M. White, *Jour. of Polym. Sci., Polym. Chem. Ed.*, Vol 19, 1367–1383 (1981). Using a stoichiometric ratio of PPO-OH having a narrowly defined mol wt, and, 3,3',5,5'-tetramethyl-4,4'-diphenoquinone produces PPO—2OH chains having mol wts in a range not well-suited for difunctionalization.

Another method for preparing PPO—2OH is based on the condensation of two PP—OH via their phenyl end groups using formaldehyde and a Lewis acid, using a stoichiometric ratio of PPO—OH and formaldehyde. Still another method is based on the oxidative copolymerization of 2,6-dimethylphenol (DMP) and 2,2'-di(4-hydroxy-3,5-diemthylphenyl)propane (or, tetramethyl bisphenol-A, TMBPA). The oxidation potential of the TMBPA is lower than that of DMP, and therefore, for a low ratio between DMP and TMBPA and specified reaction conditions and time, "prefectly" bifunctional PPO—2OH with mol wt in the range from 500–600 can be obtained. Since the reaction is performed in solution, and the mol wt of the polymer is controlled by the ratio between TMBPA and DMP, it is essential to stop the polymerization at the appropriate time. Failure to do so results in a PPO—2OH oligomer with poor functionality and uncontrolled mol wt. See Heitz, W., Stix, W., Kress, H. J., Koch, W. and Risse, W., *Polym. Prepr.*, 25(1), 136 (1984); and, Risse, W. and Heitz, W., *Makromolekulares Kolloquim*, Freiburg FRG, Preprints, p 50 (1985). By "prefectly" I specify that no oligomer having a functionality other than 2 can be detected.

Other difunctionalized PPO oligomers are disclosed in U.S. Pat. No. 3,663,625 to Neville, R. G. None of the prior art syntheses was concerned with reaction of alkali metal salts ("bisphenolates") of an oligomer of PPO or PPS which had been tailored to have phenol chain ends which could then be converted to vinyl functional groups. Nor was the importance of having perfectly bifunctional PPO or PPS recognized, at least in so far as its subsequent conversion to ether or ester chain ends having vinyl functionality.

The problem was to advance the concept of a phase transfer catalyzed etherification of a PPO oligomer having a single phenol chain end to an oligomer with two phenol chain ends. The preparation of comb-like polymers from the monofunctionalized oligomers is disclosed in my copending U.S. patent application Ser. No. 586,679 filed Mar. 6, 1984, and in an article titled "Comb-Like Polymers and Graft Copolymers from Macromers" 2. Synthesis, Characterization and Homopolymerization of a Styrene Macromer of Poly(2,6-Dimethyl-1,4-Phenylene Oxide)" by Percec, V., Rinaldi, P. and Auman, B. *Polymer Bulletin* 10, 397–403 (1983), the disclosures of which are incorporated by reference thereto as if fully set forth herein.

This invention offers an elegant and convenient solution to that problem.

SUMMARY OF THE INVENTION

It has been discovered that perfectly bifunctional PPO—2OH can be prepared by the oxidative copolymerization of DMP and TMBPA to produce an oligomer in a predetermined mol wt range, most preferably from about 1000 to about 5000; and further, that the reaction proceeds smoothly in commonly available solvents. The chain ends of the PPO—2OH are then etherified in a PTC reaction with chloromethylstyrene (ClMS), essentially quantitatively, resulting in PPO 2VB oligomer having vinylbenzyl (VB) chain ends. This PPO—2VB may be thermally polymerized to yield a crosslinked polymer having a Tg (glass transition temperature) above 200° C.

It is therefore a specific object of this invention to provide a PPO—2VB oligomer which when crosslinked is essentially insoluble in commonly available organic solvents, and also in aggressive solvents like dimethylsulfoxide (DMSO), dimethylformamide (DMF) and tetrahydrofuran (THF); which has excellent thermal stability in the range from about 150° C. to about 250° C.; and, which may be blended with known crosslinkable monomers and oligomers.

It is also a specific object of this invention to provide a PTC reaction comprising reacting a salt of a PPO—2OH oligomer with ClMS in the presence of an onium salt or other PTC so as to obtain etherification of the PPO—2OH substantially without hydrolysis thereof, as is evidenced by an essentially 100% yield obtained in a surprisingly short period of time.

It has also been discovered that perfectly difunctional PPO—2OH in a desired mol wt range may be esterified by a reaction in solution ("solution reaction") with a solvent for the reactants in the presence of base, at ambient pressure and a temperature below that at which the vinyl functional chain ends will be crosslinked.

It has further been discovered that PPO—2VB obtained as described hereinabove may be converted to an α,ω-di(ethynylphenyl)PPO in a process comprising, brominating the vinyl end groups of the styrene residues, followed by dehydrobromination in the presence of potassium-tert-butoxide ("K-t-Bu").

DETAILED DESCRIPTION OF PREFERRED EMBODIMENTS

In its preferred general embodiment this invention is directed to the preparation of a difunctionalized substantially linear crosslinkable thermoplastic polyphenylene oxide (PPO) or polythiophenylene sulfide (PPS) oligomer (together referred to as "PPR"), represented by the formula $$R^e\text{—[PPR]—}R^e \qquad \text{(I)}$$

wherein R represents O or S in an ester or ether linkage with $R^e$; so that PPR represents a polyphenylene oxide or polythiophenylene sulfide chain including a gem di-substituted carbon atom such as is present in bisphenol A "BPA(s)" or substituted bisthiophenol A "BTPA(s)" moiety, wherein BPA(s) represents

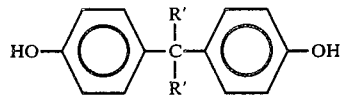

and BTPA(s) represents

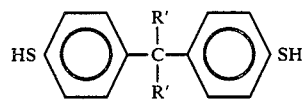

wherein
R' represents hydrogen, lower alkyl having from 1 to 5 carbon atoms, phenyl and the halogen substituents thereof, and R' may each be the same or different;

(s) represents one or more inert substituents, which, if present, may be the same or different, and include halogen, particularly chlorine or bromine; $NO_2$; alkyl having from 1 to about 18 carbon atoms ($C_1$–$C_{18}$) without regard for the spatial configuration such as normal, iso or tertiary; and, $C_1$–$C_{18}$ alkoxy; and, $R^e$ represents a residuum containing a terminal carbon to carbon double bond at each end of the oligomer.

More particularly the polyethers of this invention are represented by (i) PPO—2VB oligomers having a statistical distribution of chains having the formulae

and,

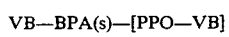

the structures of which are written on the following page;
or, analogously, (ii) PPS—2VB oligomers having a statistical distribution of chains having the formulae

and,

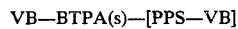

wherein
(s) represents methyl substituents at the 2 and 6 positions of each phenyl ring, and
PO and PS represent the respective residua of 2,6-dimethyl phenol, and, 2,6-dimethyl thiophenol.

STRUCTURES OF THE PPO-2OH and PPO-2VB OLIGOMERS

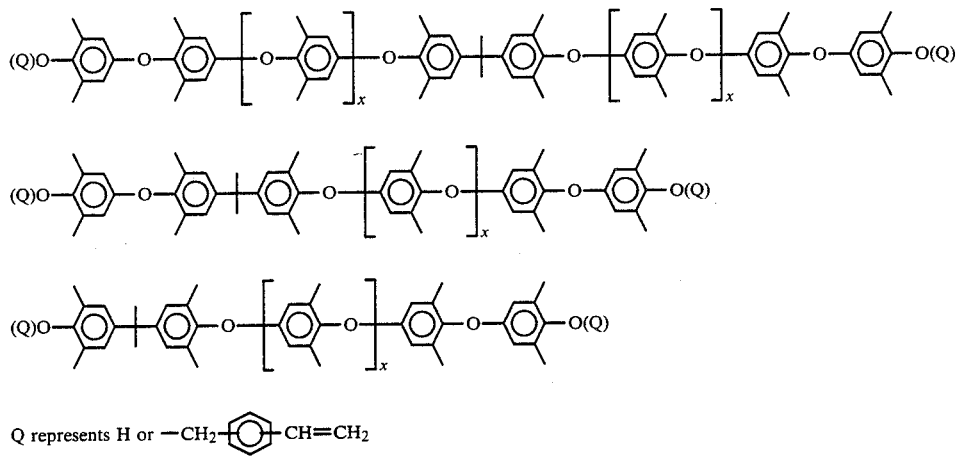

Q represents H or —CH$_2$—⌬—CH=CH$_2$ x is an integer in the range from 5 to about 50, more preferably 5 to about 25.

It will be appreciated that B(T)PA is chosen because each 2,6-dimethyl phenyl moiety on either side of the gem dimethyl carbon atom provides the same repeating unit as that of PPR. However, this choice of moiety is not critical with respect to the formation of a PPR polymer with diphenolic chain ends. It is sufficient that each moiety provide a chain with nucleophilicity which is higher than that of its low mol wt homolog.

GENERAL PREPARATION OF DIFUNCTIONALIZED PPR

As the first step, it is necessary to prepare a PPR—2RH oligomer having a number average mol wt less than about 10,000 and more preferably in the range from about 1000 to about 5000. Referring particularly to PPO—2OH, this is most conveniently accomplished by the oxidative copolymerization of a low ratio of DMP to TMBPA in a mixture of solvents which precipitates a predetermined mol wt of PPO—2OH. Under these conditions, for a constant ratio of DMP:TMBPA in the reaction mixture, the mol wt of the PPO—2OH formed is controlled by virtue of a redistribution reaction and is dictated by the PPO—2OH solubility in the reaction mixture used.

In a second step, PPO 2OH is reacted with an appropriate α,β-unsaturated haloalkyl reactant, or haloacyl reactant ("HAR") to provide an oligomer with vinyl functional chain ends. For etherification, the reaction is carried out with a haloalkyl reactant such as chloromethylstyrene ("ClMS"). For esterification, the reaction is carried out with a haloacyl reactant. In either case, the reaction proceed easily in the presence of less than 50 mole % of a PTC, relative to the moles of PPR—2RH salt, and about 10 mole % is most preferred.

Common HAR monomers are haloalkyl vinyl ethers having from 3 to about 20 carbon atoms, haloalkyl vinyl aromatic compounds having from 9 to about 30 carbon atoms, isophthaloyl and terephthaloyl chloride, acryloyl chloride and methacryloyl chloride, together referred to herein as (meth)acryloyl chloride, terminally monohalogenated α,β-unsaturated olefins having from 4 to about 18 carbon atoms, and the like. Also, HAR oligomers are selected from oligomers having a $\overline{Mn}$ less than about 10,000 and preferably less than about 5,000, a terminal haloalkyl group, and a vinyl group at the other end.

Though VB end groups are most preferred, any HAR with a comparably reactive halogen atom at one end and a vinyl group at the other, will provide excellent reaction rates and yields. Similarly, though methacrylyol chloride is the most preferred HAR for esterification, numerous available terminally monohalogenated α,β-unsaturated olefins may be used, most preferably if they include an allylic halide group. For example, 1-chloro-2-hexene is an HAR with desirable allylic halide characteristics. Also useful, but providing a slower reaction rate, is 6-chloro-1-hexene, which is not an allylic halide.

When the [PRO—2OH] oligomer is to be esterified so that R$^e$ includes a methacrylyl end group, R being O and connected to R$^e$ with an ester linkage in the formula (I) at each end, the di-esterified oligomer is represented by the formula:

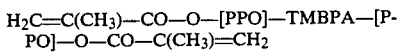

When the PPO—2OH oligomer is to be etherified so that R$^e$ includes a vinylbenzyl end group, R being O and connected to R$^e$ with an ether linkage in the formula (IV) at each end, the di-etherified oligomer is represented by the formula:

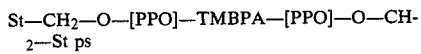

wherein "St" represents a styryl group.

The difunctionalized PPO oligomers formed by my process may be used for a host of different purposes, depending upon whether they are homopolymers, ordered polymers, or copolymers, their mol wt, T$_g$, and related chemical and physical properties. Most preferred is a mol wt in the range from about $\overline{Mn}$ 1000 to about 5000 which may be cured with a conventional free radical initiator or simply thermally crosslinked while it is being injection molded into pump housings and the like. The crosslinked PPO—2VB is an engineering plastic which has excellent solvent resistance quite unlike commercially available Norel$^R$ which is a solution of PPO in styrene, but with comparable phyiscal strength. PPO with ester chain ends, like that with ether chain ends, may be crosslinked by itself or in solution with any monomer or macromer with a reactive vinyl group. Still another use of the difunctionalized PPO oligomers is for blending with polymers to improve the processability of the blend and increase the $T_g$ of the finished product because of the generally high $T_g$ contributed by the di—[PPO] after crosslinking.

The synthesis of the novel difunctionalized ooligomers is accomplished by the peculiar action of certain onium salts in an aqueous alkaline medium, which action facilitates the etherification or esterification of the chain ends in the two phase reaction mixture. The particular phase transfer catalyst (PTC) used is not narrowly critical though it will be appreciated that some will give better results than others. The onium salts of nitrogen, phosphorus and sulfur are well known. They are ionized in aqueous solutions to form stable cations. Certain onium salts have provided the basis for phase transfer catalysis in a wide variety of reactions, a recent and comprehensive review of which is contained in Angewandte Chemie, International Edition in English, 16 493–558 (August 1977). Discussed therein are various anion transfer reactions where the onium salt exchanges its original anion for other anions in the aqueous phase. These ion pairs can then enter a water immiscible, organic liquid phase, making it possible to carry out chemistry there with the transported anion. The salt, and a HAR which has a terminal electrophilic haloalkyl group at one end, and a vinyl group at the other, are reacted under PTC reaction conditions which essentially negate hydrolysis of the HAR and increases the reactivity of the phenolate chain end. This is because the onium phenolate is dissolved in a non-polar solvent which does not solvate the onium anions.

It is essential that the difunctionalized olgiomer be prepared by reaction of the PPO-2OH or PPS-2SH with the HAR in the presence of a solubilizing amount of a PTC under aqueous alkaline conditions. By a "solubilizing amount" PTC I refer to an amount sufficient to solubilize the alkali metal salt of the PAPE oligomer formed in the aqueous phase. By "aqueous alkaline conditions" I refer to a large excess of an aqueous solution of an alkali metal hydroxide containing from about 15% to about 75% by weight (% by wt), and preferably from about 30% to about 50% by wt of alkali metal hydroxide. Preferred alkali metal hydroxides are those of sodium and potassium. By "large excess" I refer to an excess based on the number of moles of OH or SH groups originally present in the APS, preferably from about a two-fold (2 times) to a twenty-fold (20 times) excess.

The PTC process is preferably carried out in the precipitation mode by (a) precipitating the salt from an organic solvent for the PPO—2OH oligomer by reaction with an excess, based on the moles of —OH or —SH groups originally present in said PAPE oligomer, of an aqueous solution of an alkali metal hydroxide; (b) solubilizing the salt by adding a minor molar amount of the PTC, based on the mole equivalents (mol equivs) of —OH or —SH groups originally present in the PRO—2OH oligomer; and, (c) reacting solubilized salt with the HAR present in at least an equimolar amount, based on the moles of —OH or —SH groups originally present in the PPO—2OH oligomer.

The PTC process may also be carried out in the "in situ mode" by (a) forming the salt "in situ" by contacting the PPO—2OH oligomer with the PTC dissolved in an organic solvent for the PPO—2OH oligomer and PTC; thereafter (b) adding at least one molar equivalent of the HAR for each mole of OH or —SH groups originally present in the PPO—2OH oligomer; then (c) adding an excess, based on the moles of —OH or —SH groups present, of an aqueous solution of an alkali metal hydroxide.

By PTC, I refer to onium salts, macrocyclic polyethers (crown ethers), macrobicyclic polyethers (cryptands), and the like, most preferred being the onium salts of a Group VA element of the Periodic Table having certain structural limitations. The preferred salts have the formula $R_nY^+X^-$ where Y is chosen from N, P and S; R represents either different or identical monovalent organic radicals bonded to Y by covalent linkages; $X^-$ is a counterion; and n is an integer which may be 3 or 4. When Y is pentavalent, for example P or N, then N=4, and when Y is tetravalent, for example S, then n=3. In an analogous manner, onium salts having certain multivalent organic substituents may be useful in this invention. Examples include multivalent organic radicals that include Y in a ring, and those that are bonded to more than one Y.

More preferred onium salts for use in this invention have the formula $(R_aR_bR_cR_dY^+)X^-$ wherein Y is N or P, and $R_a$-$R_d$ are monovalent hydrocarbon radicals preferably selected from the group consisting of alkyl, alkenyl, aryl, alkaryl, aralkyl, and cycloalkyl moieties or radicals, optionally substituted with suitable heteroatom-containing functional groups. The total number of carbon atoms in $R_a$, $R_b$, $R_c$, and $R_d$ if the salt is quaternary, should be at least 10 and is preferably in the range from about 15 to 40. No theoretical maximum number of carbon atoms for inclusion in the onium salts exists, although in general, about 70 carbon atoms represents the upper limit imposed by practical limitations. Since the liquid phases involved are aqueous and organic, the number of carbon atoms and structure of the onium salts are usually selected to impart to the salt the requisite solubility in the organic phase. The onium salt itself is nonreactive to all materials in the reaction mixture except the reactants themselves, and the addition of the HAR to the PPR—2RH takes place in the organic phase.

Most preferred onium salts have Y=N, and the hydrocarbon radicals where $R_a$ is $C_2H_5$, and $R_b$, $R_c$, and $R_d$ are each selected from the group consisting of n—$C_4H_9$; n—$C_5H_{11}$; mixed $C_5H_{11}$; n—$C_6H_{13}$; mixed $C_6H_{13}$; $C_6H_5$; $C_6H_5CH_2$; n—$C_8H_{17}$; n—$C_{12}H_{25}$; n—$C_{18}H_{37}$; mixed $C_8$-$C_{10}$ alkyl; and the like. However, $R_a$ may also be selected from n—$C_3H_7$ and n—$C_4H_9$.

Various counterions may be used, including Cl$^-$, Br$^-$, I$^-$, F$^-$, HSO$_4^-$ and the like. Most preferred is HSO$_4^-$. A commercially available and highly effective onium salt PTC is tetrabutylammonium hydrogen sulfate ("TBAH").

The process for forming an α,ω-divinylfunctionalized substantially linear crosslinkable polyphenylene oxide (PPO) or polyphenylene sulfide (PPS) oligomer, together referred to as "PPR" where R represents either O or S, comprises, (a) reacting a salt of an essentially perfectly difunctional PPR—2RH oligomer having a number average molecular weight $\overline{Mn}$ in the range from about 1000 to about 10,000 with a haloalkyl reactant, or haloacyl reactant ("HAR") essentially quantitatively in the presence of a phase transfer catalyst ("PTC") distributed between an organic phase and an aqueous phase in an amount sufficient to solubilize said salt and substantially negate hydrolysis of said PPR—2RH oligomer, so as to yield a functional head consisting of the residue of said HAR at each end of said PPR—2RH oligomer;

(b) precipitating and divinylfunctionalized PPR oligomer from said organic phase; and, (c) recovering said divinylfunctionalized PPR oligomer.

In the best mode of the invention, the embodiment of greatest interest is the etherification of PPO in which the phenyl ring is 2,6-dimethyl substituted, and the PPO chains contain a BPA unit in the structures shown, for the reasons given hereinabove. The PPO—2OH may range in $\overline{M}n$ as high as 10,000 and the preferred HAR used is ClMS which results in VB chain ends for the etherified oligomer. Further details for the preparation are set forth herebelow.

Synthesis of 2,2'-di(4-hydroxy-3,5-dimethylphenyl)propane ("TMBPA"):

TMBPA was prepared by the condensation of 2,6-dimethylphenol (DMP) and acetone in the presence of dried HCl according to a procedure disclosed in *J. Chem. Soc.*, 415, (1962) by R. F. Curtis. Successive crystallizations from aqueous methanol and benzene gave white needles with a mp 164°–165° C.

The structure was confirmed by analysis. 200 MHz $^1$H-NMR spectra were recorded on a Varian XL-200 spectrometer. All spectra were obtained in CDCl$_3$ solutions at room temperature, and with TMS as internal standard. Number avg mol wts were determined by analyzing the concentration of the polymer chain ends from 200 MHz $^1$H-NMR spectra, by vapor pressure osmometry (Wescan Model 233 vapor pressure osmometer) from chloroform solutions at 36° C., and by gel permeation chromatography (GPC). GPC analyses were carried out with a Perkin-Elmer Series 10LC equipped with LC-100 column oven, LC600 Auto Sampler and Sigma 15 data station. The measurements were made by using the UV detector, THF solvent (1 ml/min, 40° C.), a set of PL-gel columns 10$^2$, 5.10$^2$, 10$^3$, 10$^4$ and 10$^5$ Å, and a calibration plot constructed with polystyrene standards.

Synthesis of α,ω-bis(2,6-dimethylphenol)-poly(2,6-dimethyl-1,4-phenylene oxide) ("PPO—2OH"):

The oxidative copolymerization of DMP and TMBPA was carried out under two different experimental procedures. In the first one (a closed system), oxygen was introduced in the reaction mixture by monitoring its consumption in a closed reaction system similar to one described in *Polym. Chem. Ed.*, 22, 3203 (1984) by D. P. Mobley. In the second procedure, oxygen was passed through the reaction mixture in an open reaction system (open system). Magnetic or mechanical stirring was used in both cases and it was evident that the method of stirring influences the mol wt especially when a water/methanol mixture is used as polymerization solvent.

A general procedure for the synthesis of PPO—2OH is as follows: To a solution of 4.0 g (0.03274 mole) of 4-dimethylaminopyridine in 61.5 ml methanol and 8.5 ml water was added 0.6 g (0.00606 mole) of CuCl. Oxygen was passed through the reaction mixture for 15 min. At this time a solution of 10 g (0.08185 mole) of DMP and 5.81 g (0.02046 mole) of TMBPA in 100 ml of methanol was added to the reaction mixture. Oxygen was passed through the reaction mixture for 4.0–4.5 hr. The precipitated polymer was filtered and dried at room temperature under vacuum. Two purifications were carried out by precipitating a chloroform solution of the polymer in methanol (containing a few drops of dil HCl). The $^1$H-NMR spectra confirms the structure of the PPO—2OH. of PPO—2OH under various conditions. The $T_g$ was determined from the second heating scan.

Synthesis of α,ω-bis(m, p-vinylbenzylether) of PPO—2OH ("PPO—2VB"):

To a stirring solution of 0.5 g (0.733 mmole —OH) of PPO—2OH (sample 1 from Table 1, $\overline{M}n = 1,364$) in 3 ml of benzene, was added 0.5 ml of 50% aqueous NaOH. The sodium salt of the PPO—2OH precipitated. The reaction mixture became homogeneous after 0.05 g (0.1472 mmole) of TBAH were added. A mixture of m-, p-ClMS (0.336 g, 2.199 mmole) was introduced in the reaction mixture, and the stirring was continued for 10 hr at room temperature. The organic layer was separated from the aqueous one, washed with water, and precipitated in methanol. Two more purifications were done by precipitating a chloroform solution of PPO—2VB in methanol. The polymer was filtered and dried under vacuum. The $^1$H-NMR spectra confirm the structure of PPO—2VB. Table II herebelow presents experimental data relating to the synthesis of PPO—2VB from PPO—2OH having different mol wts.

The VB chain ends of the etherified PPR maybe converted to ethynyl chain ends by bromination of the chain ends followed by dehydrobromination. The temperature and pressure for carrying out the reactions are not narrowly critical but in the general range conventionally used for bromination and dehydrobromination, typically proceeding at ambient pressure and a temperature in the range from about 10° C. to about 70° C. depending upon the solvent used and the mol wt of the PPR—2VB.

Thermal Characterization of PPO—2OH and PPO—2VB:

Examination of the Tg determined from the second scan, of each sample of PPPO—2OH in Table I shows an increase in Tg with increasing mol wt.

To study the thermal reactivity of the PPO—2VB typical DSC traces for a PPO—2OH, and PPO—2VB (second scan, first scan up to 120° C.) and of the third heating scan of the same sample are studied. In all cases the first scan was stopped just above the Tg, quenched to room temperature, and rescanned to read the Tg of the PPO—2VB. These Tgs are identified as "Tgi" in Table II.

The change in mol wt of the PPO—2VB relative to that of the precursor PPO—2OH is attributable to the redistribution reaction of the PPO—2OH during the etherification of its chain ends. A comparison of Tg and Tgi for PPO—2OH and PPO—2VB respectively, having the same mol wt, shows the latter (for PPO—2VB) is lower than that of the former (PPO—2OH). This is attributable to hydrogenbonding from the phenol chain ends. The temperature at which the polymerization exotherm starts is identified as "Ts"; at which it ends is "Te"; and the final Tg of the polymerized oligomer, as obtained from the third heating scan, is identified as "Tgf". In no sample could additional annealing after the third scan enhance the Tgf. If one was to plot Tg (of PPO—2OH), Tgi (of PPO—2VB) and Tgf (of crosslinked PPO—2VB) as a function of mol wt, one would find that each difference (Tgf—$T_g$) and Tgf—Ti) decrease with increase in the polymer mol wt. However, the oligomers generate networks having the same Tgf and different mol wts in the segments forming the networks. In no case did the Tgf exceed the $T_g$ of a relatively high mol wt PPO such as is commercially available (200° C.). It is also observed that the increase in Tg by thermal polymerization can be as high as 100° C. for the low mol wt oligomers, which proves desirable for several particular applications.

It is concluded that the thermal reactivity of PPO—2VB is unexpectedly higher than that of the aromatic polyether sulfones containing VB chain ends which are the subject matter of my parent application Ser. No. 586,678. This may be attributed to both styrene chain ends and polystyrene type units obtained by polymerization, being miscible with PPO but not miscible with aromatic polyether sulfones. A major difference between APS with styryl chain ends and PPO with styryl chain ends is that polymerization of the latter occurs in solution while in the former polymerization occurs in heterophase.

TABLE I

Synthesis and Characterization of PPO—2OH

| Sample No. | Volume % of H2O or ClBz in the Solvent Mixture | | Reaction Time, Hr. | Yield % | Polymer Molecular Weight by GPC(VPO/NMR) | | | Tg (°C.) |
|---|---|---|---|---|---|---|---|---|
| | H2O/MEOH | ClBz/MEOH | | | Mn | Mw | Mw/Mn | |
| 1 | 30.0 | | 4.0(A) | 70 | 1364 (1,197/1,063) | 1578 | 1.16 | 117 |
| 2 | 30.0 | | 4.0(A) | 70 | 1507 | 1981 | 1.31 | 118 |
| 3 | 20.0 | | 4.0(A) | 82 | 1785 (1,500/1,750) | 2546 | 1.46 | 130 |
| 4 | 5.0 | | 4.0(A) | 89 | 2159 | 3164 | 1.47 | 150 |
| 5 | 20.0 | | 4.5(B) | 30 | 2272 | 3533 | 1.56 | 142 |
| 6 | 5.0 | | 4.0(A) | 91 | 2418 | 4276 | 1.77 | 155 |
| 7 | 35.0 | | 4.5(C) | 34 | 2919 | 5149 | 1.76 | 153 |
| 8 | 10.0 | | 4.5(C) | 64 | 3128 | 4568 | 1.46 | 167 |
| 9 | | 5.30 | 4.0(B) | 53 | 3972 (3440/—) | 7260 | 1.83 | 167 |
| 10 | | 15.88 | 4.0(B) | 40 | 4002 | 7973 | 1.99 | 166 |
| 11 | | 15.88 | 4.5(B) | 42 | 4203 | 8214 | 1.95 | 174 |
| 12 | | 10.60 | 4.0(B) | 53 | 4222 | 8607 | 2.04 | 178 |
| 13 | | 20.00 | 4.0(B) | 30 | 4685 (3973/—) | 8036 | 1.93 | 185 |
| 14 | | 5.30 | 4.0(B) | 60 | 4932 | 9624 | 1.95 | 185 |

(A)Mechanical stirrer and closed system.
(B)Magnetic stirrer and open system.
(C)Mechanical stirrer and closed system.

TABLE II

Molecular Weights and Thermal Characterization of PPO—2OH and PPO—2VB.

| Sample No. | Molecular Weight by GPC (VPO/NMR) for PPO—2OH | | | PPO—2OH Tg (°C.) | Molecular Weight by GPC (VPO/NMR) for PPO—2VB | | | PPO-2VB | | | |
|---|---|---|---|---|---|---|---|---|---|---|---|
| | Mn | Mw | Mw/Mn | | Mn | Mw | Mw/Mn | Tgi (°C.) | Ts (°C.) | Te (°C.) | Tgf (°C.) |
| 1 | 1364 (1,197/1,063) | 1578 | 1.16 | 117 | 2049 | 2703 | 1.32 | 115 | 147 | 270 | 220 |
| 2 | 1507 (—/1,038) | 1981 | 1.31 | 118 | 2011 (—/1,639) | 2868 | 1.43 | 116 | 145 | 270 | 220 |
| 3 | 1785 (1,500/1,750) | 2546 | 1.46 | 130 | 2117 | 2807 | 1.33 | 124 | 150 | 270 | 220 |
| 4 | 2159 (—/1,776) | 3164 | 1.47 | 150 | 2895 | 4576 | 1.58 | 137 | 165 | 270 | 220 |
| 5 | 2272 | 3533 | 1.56 | 142 | 2681 | 3329 | 1.24 | 136 | 170 | 270 | 216 |
| 6 | 2418 | 4276 | 1.77 | 155 | 3403 | 6493 | 1.91 | 146 | 170 | 270 | 218 |
| 7 | 2919 | 5149 | 1.76 | 153 | 2545 | 3328 | 1.31 | 138 | 170 | 270 | 216 |
| 8 | 3128 | 4568 | 1.46 | 167 | 3032 | 4579 | 1.51 | 134 | 140 | 270 | 217 |
| 9 | 3972 (3440/—) | 7260 | 1.83 | 167 | 4031 | 7613 | 1.89 | 159 | 174 | 270 | 220 |
| 10 | 4002 | 7973 | 1.99 | 166 | 4033 | 7587 | 1.88 | 162 | 170 | 270 | 220 |
| 11 | 4203 | 8214 | 1.95 | 174 | 4648 | 9683 | 2.08 | 162 | 170 | 270 | 220 |
| 12 | 4222 | 8607 | 2.04 | 178 | 4262 | 8888 | 2.08 | 159 | 170 | 270 | 220 |
| 13 | 4685 (3973/—) | 8036 | 1.93 | 185 | 4320 | 9624 | 1.86 | 161 | 177 | 270 | 220 |
| 14 | 4932 | 9624 | 1.95 | 185 | 4499 | 8702 | 1.93 | 160 | 174 | 270 | 220 |

Tgi = initial Tg of PPO-2VB.
Ts — temperature at which exothermal process starts.
Te — temperature at which exothermal processs ends.
Tgf — final Tg of the thermally polymerized PPO-2VB.

I claim:

1. A difunctionalized substantially linear crosslinkable thermoplastic polyphenylene oxide (PPO) or polythiophenylene sulfide (PPS) oligomer (together referred to as "PPR"), represented by the formula $R^e$—[PPR]—$R^e$

wherein,

R represents O or S in an ester or ether linkage with R$^e$; so tht

PPR represents a polyphenylene oxide or polythiophenylene sulfide chain including a gem di-substituted carbon atom; and, R$^e$ represents a residuum containing a terminal carbon to carbon double bond at each end of the oligomer.

2. The etherified oligomer of claim 1 represented by PPO—2VB oligomers having a statistical distribution of chains having the formulae

[PPO—VB]—BPA(s)—[PPO—VB]

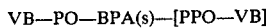
VB—PO—BPA(s)—[PPO—VB]

and,

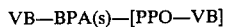
VB—BPA(s)—[PPO—VB]

wherein,
(s) represents one or more inert substituents, which, if present, may be the same or different, and include chlorine or bromine; NO$_2$; alkyl having from 1 to about 18 carbon atoms (C$_1$–C$_{18}$) without regard for the spatial configuration; and, C$_1$–C$_{18}$ alkoxy;

PO represents the residuum of a 2,6-substituted phenol;

VB represents a vinylbenzyl chain end connected to the chain through an ether linkage;

BPA represents

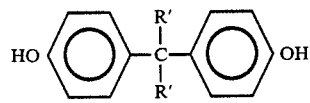

wherein R' represents hydrogen, lower alkyl having from 1 to about 5 carbon atoms, phenyl and the halogen substituents thereof, and R' may each be the same or different; and, the number average molecular weight of the oligomers is in the range from about 1000 to about 5000.

3. The etherified oligomer of claim 1 represented by PPS—2VB oligomers having a statistical distribution of chains having the formulae

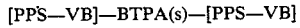
[PPS—VB]—BTPA(s)—[PPS—VB]

VB—PS—BTPA(s)—[PPS—VB]

and,

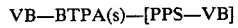
VB—BTPA(s)—[PPS—VB]

wherein,
(s) represents one or more inert substituents, which, if present, may be the same or different, and include chlorine or bromine; NO$_2$; alkyl having from 1 to about 18 carbon atoms (C$_1$–C$_{18}$) without regard for the spatial configuration; and, C$_1$–C$_{18}$ alkoxy;

PS represents the residuum of a 2,6-substituted thiophenol;

VB represents a vinylbenzyl chain end connected to the chain through an ether linkage;

BTPA represents

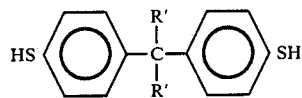

wherein R' represents hydrogen, lower alkyl having from 1 to about 5 carbon atoms, phenyl and the halogen substituents thereof, and R' may each be the same or different; and, the number average molecular weight of the oligomers is in the range from about 1000 to about 10,000.

4. The oligomer of claim 2 wherein,
BPA(s) is the residue of 4,4'-isopropylidenediphenol (or, 2,2-bis(4-hydroxyphenyl)propane); and,
PPO represents a poly(2,6-dimethyl-1,4-phenylene oxide) chain.

5. A process for forming an α,ω-divinylfunctionalized substantially linear crosslinkable polyphenylene oxide (PPO) or polyphenylene sulfide (PPS) oligomer, together referred to as "PPR" where R represents either O or S, comprises, (a) reacting a salt of an essentially perfectly difunctional PPR—2RH oligomer having a number average molecular weight $\overline{M}n$ in the range from about 1000 to about 10,000, with a haloalkyl reactant, or haloacyl reactant ("HAR") essentially quantitatively in the presence of a phase transfer catalyst ("PTC") distributed between an organic phase and an aqueous phase in an amount sufficient to solubilize said salt and substantially negate hydrolysis of said PPR—2RH oligomer, so as to yield a functional head consisting of the residue of said HAR at each end of said PPR—2RH oligomer;

(b) precipitating said divinylfunctionalized PPR oligomer from said organic phase; and, (c) recovering said divinylfunctionalized PPR oligomer.

6. The process of claim 5 including the steps of
(a) precipitating said salt from an organic solvent for said PPR—2RH oligomer by reaction with an excess, based on the moles of —OH or —SH groups originally present in said PPR—2RH oligomer, of an aqueous solution of an alkali metal hydroxide;

(b) solubilizing said salt by adding a major molar amount of said PTC, based on the mole equivalents (mol equivs) of —OH or —SH groups originally present in said PPR—2RH oligomer; and, (c) reacting solubilized salt with said HAR present in an equimolar amount, based on the moles of —OH or —SH groups originally present in said PPR—2RH oligomer.

7. The process of claim 6 wherein said PPR—2RH is PPO—2OH and said HAR is chloromethylstyrene.

8. The process of claim 7 wherein step (c) of reacting said solubilized salt with chloromethylstyrene is carried out at a temperature in the range from about 10° C. to about 70° C. and at a pressure in the range from about 1 to about 20 atmospheres.

9. The process of claim 5 including the steps of
(a) forming said salt in situ by contacting said PPR—2RH oligomer with said PTC dissolved in an organic solvent for said PPR—2RH oligomer and PTC; thereafter (b) adding one molar equivalent of said HAR for each mole of —OH or —SH groups originally present in said PPR—2RH oligomer; then (c) adding an excess, based on the moles of —OH or —SH groups present, of an aqueous solution of an alkali metal hydroxide.

10. The process of claim 9 wherein said PPR—2RH is PPO—2OH and said HAR is chloromethylstyrene.

11. The process of claim 10 wherein step (c) of adding aqueous alkali metal hydroxide solution is carried out at a temperature in the range from about 10° C. to about 70° C. and at a pressure in the range from about 1 to about 20 atmospheres.

* * * * *